(12) United States Patent
Yamakawa et al.

(10) Patent No.: US 8,691,386 B2
(45) Date of Patent: Apr. 8, 2014

(54) BONDED BODY OF A CARBON THIN FILM COVERED ARTICLE AND A RUBBER

(75) Inventors: Kazuto Yamakawa, Owake (JP); Yuusuke Matsuya, Owake (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/579,255

(22) PCT Filed: Dec. 9, 2010

(86) PCT No.: PCT/JP2010/072174
§ 371 (c)(1),
(2), (4) Date: Aug. 15, 2012

(87) PCT Pub. No.: WO2011/099220
PCT Pub. Date: Aug. 18, 2011

(65) Prior Publication Data
US 2012/0315472 A1    Dec. 13, 2012

(30) Foreign Application Priority Data
Feb. 15, 2010  (JP) .................................. 2010-030130

(51) Int. Cl.
*B23B 9/00* (2006.01)
*B23B 7/04* (2006.01)
*C01B 31/00* (2006.01)
*B23B 37/00* (2006.01)
*E01D 1/00* (2006.01)

(52) U.S. Cl.
USPC ..... 428/408; 428/420; 423/445 R; 156/307.1; 427/902; 14/78

(58) Field of Classification Search
None
See application file for complete search history.

(56) References Cited

U.S. PATENT DOCUMENTS

| | | | | |
|---|---|---|---|---|
| 5,858,536 | A * | 1/1999 | Yanagisawa | 428/408 |
| 7,604,663 | B1 * | 10/2009 | Reimink et al. | 623/2.1 |
| 2005/0110222 | A1 * | 5/2005 | Matsumoto et al. | 277/592 |
| 2007/0092729 | A1 * | 4/2007 | Kayao et al. | 428/411.1 |
| 2007/0196673 | A1 * | 8/2007 | Hancer et al. | 428/447 |
| 2007/0208321 | A1 * | 9/2007 | Leach et al. | 604/500 |

FOREIGN PATENT DOCUMENTS

| | | |
|---|---|---|
| CA | 2027210 | 4/1991 |
| EP | 0422392 | 4/1991 |
| JP | 11-131424 A | 5/1999 |
| JP | 2000-012054 | 1/2000 |
| JP | 2002-059486 | 2/2002 |
| JP | 2004-314407 | 11/2004 |

(Continued)

OTHER PUBLICATIONS

M. Demirors "Styrene-Butadiene Copolymers" Encyclopedia of Polymer Science and Technology, Oct. 22, 2001, John Wiley & Sons, Inc., vol. 4, pp. 229-247.*

(Continued)

*Primary Examiner* — Gwendolyn Blackwell
*Assistant Examiner* — Seth Dumbris
(74) *Attorney, Agent, or Firm* — Thorpe North & Western LLP

(57) ABSTRACT

A bonded body 10 of a carbon film covered article and a rubber is formed by bonding a carbon film covered article 13 having a carbon film 12 formed on a surface of an article 11 to an unvulcanized rubber 14 by affixing and vulcanizing. Thereby, a bonded body of rubber and, for example, metal can be provided without the need for an adhesive.

20 Claims, 1 Drawing Sheet

(56) References Cited

FOREIGN PATENT DOCUMENTS

| | | |
|---|---|---|
| JP | 2007-126746 | 5/2007 |
| JP | 2009-504448 | 2/2009 |
| TW | 2008-25202 | 6/2008 |
| WO | WO 2007/020139 A1 | 2/2007 |

OTHER PUBLICATIONS

J. Noordermeer "Ethylene-Propylene Elastomers" Encyclopedia of Polymer Science and Technology, Oct. 15, 2002, John Wiley & Sons, Inc., vol. 6, pp. 178-196.*

J. Robertson, "Diamond-like amorphous carbon" 2002, Materials Science and Engineering, R 37, p. 129.*

PCT Application PCT/JP2010/072174; filed Dec. 9, 2010; Kazuto Yamakawa; International Search Report mailed Mar. 22, 2011.

Extended European Search Report dated Aug. 5, 2013, 5 pages, Germany.

Taiwanese Office Action dated Sep. 13, 2013, 9 pages, Taiwan.

Chinese Office Action dated Dec. 27, 2013, 10 pages, China.

Yunzhong Li, Rubber Materials and Molding, Northwest Polytechnical University Press, 1989, 4 pages, China.

* cited by examiner

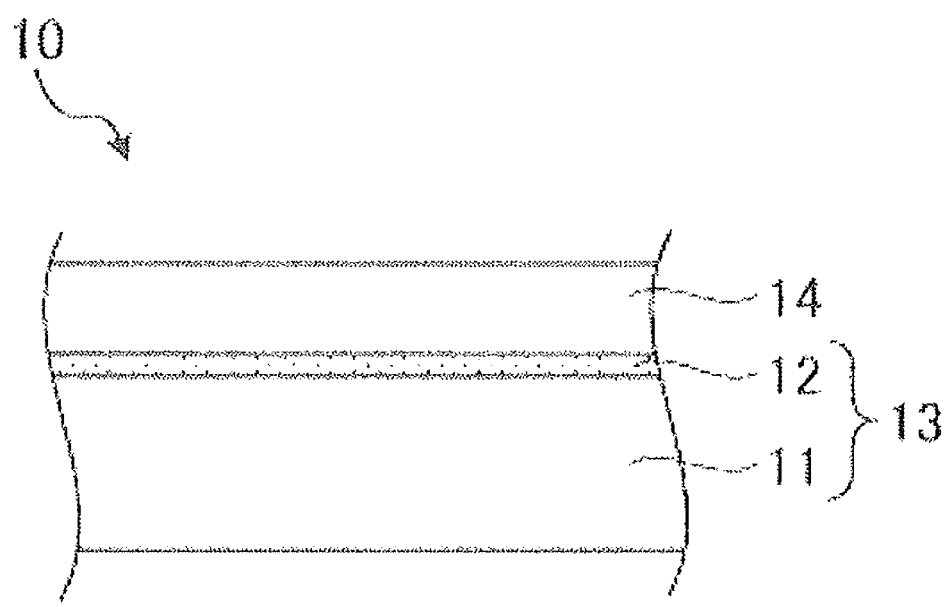

BONDED BODY OF A CARBON THIN FILM COVERED ARTICLE AND A RUBBER

TECHNICAL FIELD

The present technology relates to a bonded body of a carbon thin film covered article and a rubber having enhanced bonding strength between the article covered with the carbon thin film and an unvulcanized rubber.

BACKGROUND ART

Conventionally, laminated rubber bearing bodies for use as fixed supports that are interposed between lower structures of bridge abutments, bridge piers, or the like and upper structures of bridge girders and the like have been used. Such laminated rubber bearing bodies are formed from a bonded body constituted by metal and a rubber and an adhesive is used to bond the two constituents together (see for example, Japanese Unexamined Patent Application No. H11-131424A).

However, because an adhesive is necessary when forming conventional bonded bodies, an environmental problem is encountered when manufacturing the bonded bodies due to the use of adhesive solvents and the like.

Particularly, due to the advance in recent years of Pollutant Release and Transfer Register (PRTR) regulations, strict restrictions have been placed on the use of organic solvents, and alternatives thereto have been investigated.

Additionally, bonded bodies using adhesives are exposed to outdoor conditions, particularly ultraviolet rays for extended periods of time, which leads to deterioration problems.

SUMMARY

The present technology provides a bonded body of a rubber and, for example, a metal wherein an adhesive is not necessary.

A first example of the present technology for achieving the object described above is a bonded body of a carbon thin film covered article and a rubber. The bonded body is obtained by bonding a carbon thin film covered article having a carbon thin film formed on a surface of an article to an unvulcanized rubber by affixing and vulcanizing.

A second example is the bonded body of the first example, wherein the carbon thin film is a diamond-like carbon film (DLC film).

A third example is the bonded body of the first or the second examples, wherein the article is formed from one of a metal, a resin, or a rubber.

A fourth example is the bonded body of any one of the first to the third examples, wherein the carbon thin film is formed by a plasma CVD process.

A fifth example is the bonded body of any one of the first to the fourth examples, wherein the unvulcanized rubber is vulcanized using either a sulfur vulcanizing agent or a peroxide vulcanizing agent.

A sixth example is a method of manufacturing a bonded body, including: obtaining a bonded body of a carbon thin film covered article and a rubber by forming a carbon thin film on a surface of an article, then directly affixing an unvulcanized rubber thereto and, thereafter, vulcanizing.

According to the present technology, a bonded body displaying excellent bonding strength between a carbon thin film covered article and a rubber can be obtained by forming a carbon thin film on a surface of an article, then directly affixing an unvulcanized rubber thereto and, thereafter, vulcanizing.

BRIEF DESCRIPTION OF THE DRAWING

FIG. 1 is a schematic view of a configuration of a bonded body of a carbon thin film covered article and a rubber.

DETAILED DESCRIPTION

The present technology is explained in detail below with reference to the accompanying drawing. The examples of the present technology explained below do not limit the present technology. Furthermore, the constituents of the following examples include those constituents that are essentially identical or that could be easily conceived by a person skilled in the art.

EXAMPLES

A bonded body of a carbon thin film covered article and a rubber according to the example of the present technology is described while referring to the drawing. FIG. 1 is a schematic view of a configuration of a bonded body of a carbon thin film covered article and a rubber.

As illustrated in FIG. 1, a bonded body 10 of a carbon thin film covered article and a rubber is formed by bonding a carbon thin film covered article 13 having a carbon thin film 12 formed on a surface of an article 11 to an unvulcanized rubber 14 by affixing and vulcanizing.

Here, a reason for using the unvulcanized rubber, as described hereinafter, is to enhance adhering (bonding) strength with the carbon thin film.

Bondable rubbers that can be used in the present technology are not particularly limited as long as the rubber will be vulcanized (cross-linked). Preferable examples include rubbers that can be vulcanized (cross-linked) using sulfur vulcanizing agents and/or peroxide cross-linking agents such as diene rubbers and variants thereof (i.e. NR, IR, epoxidized natural rubber, SBR, BR (high cis BR and low cis BR), NBR, hydrogenated NBR, hydrogenated SBR, or the like); olefin rubbers and variants thereof (i.e. ethylene propylene rubber (EPDM, EPM), maleic acid-modified ethylene propylene rubber (M-EPM), butyl rubber (IIR), copolymers of isobutylene and an aromatic vinyl or a diene monomer, acrylic rubber (ACM), halogen-containing rubbers (i.e. Br-IIR, Cl-IIR, a brominated isobutylene para-methyl styrene copolymer (Br-IPMS), hydrin rubbers (CHC, CHR), chlorosulfonated polyethylene (CSM), chlorinated polyethylene (CM), maleic acid-modified chlorinated polyethylene (M-CM)); and the like.

In the present technology, the carbon thin film covering the surface of the article is an amorphous carbon film, and is generally referred to as "DLC film".

"DLC" is an abbreviation of "Diamond-Like Carbon", and a diamond-like carbon film is a film formed from a material containing carbon atoms as a major constituent and a trace amount of hydrogen atoms. In contrast to diamond constituted by carbon atoms having a diamond structure (SP3 hybrid orbital) and graphite, which is a material that is also constituted by carbon atoms having a graphite structure (SP2 hybrid orbital), DLC has an amorphous structure including both the SP3 hybrid orbital and the SP2 hybrid orbital, and includes fractional bonding with hydrogen.

An example of forming the carbon thin film (DLC film) is a method including forming a diamond-like thin film on an article by ionizing a hydrocarbon gas (methane, benzene, or the like) in a high vacuum by plasma discharge, then accelerating to impinge the hydrocarbon ions by means of a negative bias voltage applied to the article.

Additionally, the film may be formed by a variety of methods including a high-frequency plasma CVD process, an ionization deposition process, a sputtering process, an arc ion plating process, or the like.

A film thickness of the carbon thin film covering the article is not particularly limited, and is preferably 0.1 µm or greater and more preferably 0.2 µm or greater.

According to the present technology, the bonded body of the carbon thin film covered article and the rubber is obtained by first forming the carbon thin film on the surface of the article, then directly affixing the unvulcanized rubber thereto and, thereafter, vulcanizing.

While enhancement of the bonding strength of the bonded body obtained in such manner is not sure at this point in time, the following is surmised.

First, regarding the structure of the DLC film that is the carbon thin film, element constituents thereof are carbon (C) and hydrogen (H). In contrast, regarding the unvulcanized rubber affixed to the article on which the carbon thin film is formed, the vulcanizing agent compounded in the unvulcanized rubber causes a carbon radical to be generated by extracting the hydrogen from the hydrocarbon of the DEC film and the carbon radical causes a chain to be generated. This results in the generation of an interactual crosslinking reaction between the carbon thin film and the rubber and both the constituents being firmly bonded.

In other words, with sulfur cross-linking of the rubber, the sulfur is an S8 cyclic molecule. The sulfur opens and a long chain sulfur radical is generated through heating. This long chain sulfur radical bombards a rubber molecule in the following manner and forms sulfur cross-links. In other words, due to the reaction of extracting hydrogen from an α-methylene adjacent to a C=C double bond (SP2 hybrid orbital) in the rubber molecule, radicals are generated, and cross-linking is facilitated by the sulfur.

The DLC film structure has C=C double bonds and hydrogen as well, and, therefore, a network is formed according to the same mechanisms as with the rubber.

Additionally, with peroxide cross-linking of the rubber, the peroxide decomposes, and radicals are generated. As with sulfur cross-linking, due to the reaction of extracting hydrogen from the α-methylene adjacent to the C=C double bond (SP2 hybrid orbital) in the rubber molecule, radicals are generated, and cross-linking is facilitated by the radicals.

The vulcanizing (cross-linking) agent for use in the present technology is not particularly limited, but preferably a sulfur vulcanizing agent or an organic peroxide cross-linking agent is used.

Examples of vulcanizing (cross-linking) agents other than the sulfur vulcanizing agent and the organic peroxide cross-linking agent include metal oxides, phenolic resins, and quinonedioxime vulcanizing (cross-linking) agents.

Examples of sulfur vulcanizing agents include powdered sulfur, precipitated sulfur highly dispersible sulfur, surface treated sulfur, insoluble sulfur, dimorpholine disulfide, and alkylphenol disulfide.

Additionally, examples of organic peroxide vulcanizing (cross-linking) agents include benzoyl peroxide, t-butyl hydroperoxide, 2,4-dichlorobenzoyl peroxide, 2,5-dimethyl-2,5-di(t-butylperoxy)hexane, and 2,5-dimethylhexane-2,5-di(peroxyl benzoate).

Examples of other vulcanizing (cross-linking) agents include zinc oxide, magnesium oxide, litharge, p-quinone dioxime, p-dibenzoylquinone dioxime, poly-p-dinitrosobenzene, and methylenedianiline.

Examples of vulcanization accelerators include aldehyde-ammonia (i.e. hexamethylene tetramine (H)), guanidine (i.e. diphenylguanidine), thiourea (i.e. ethylene thiourea), thiazole (i.e. dibenzothiazyl disulfide (DM); 2-mercaptobenzothiazole and zinc salts thereof), sulfenamide, thiuram (i.e. tetramethylthiuram disulfide (TMTD), dipentamethylenethiuram tetrasulfide), and dithiocarbamate salts (i.e. Na-dimethyl dithiocarbamate, Zn-dimethyl dithiocarbamate, Te-diethyl dithiocarbamate, Cu-dimethyl dithiocarbamate, Fe-dimethyl dithiocarbamate, pipecholine pipecolyldithiocarbamate) vulcanization accelerators.

A general auxiliary agent for rubber can be used in conjunction as an auxiliary agent for promoting cross-linking. For example, zinc oxide, stearic acid, oleic acid, and their zinc salts can be used.

The additives described above may be used alone or may be used in any combination of two or more types.

In the present technology, the article on which the carbon thin film is formed is not particularly limited and may be any article as long as the article can be covered in an excellent manner with the carbon thin film.

For example, examples of materials of the article include metals, resins, glass, ceramics, and the like.

Examples of the article include hoses, conveyor belts, laminated rubber bearing bodies, rubber rolls, and the like.

Furthermore, with the bonded structure, the gas barrier properties (inherent properties of the carbon thin film) can be taken advantage of. Therefore, an article having excellent gas barrier properties can be provided.

Therefore, conventionally, when bonding a rubber to a metal article, or the like, it was necessary to use an adhesive to bond the two constituents together, but according to the present technology, this adhesive can be made unnecessary.

As a result, the need for high-cost adhesive materials is eliminated, the need for removing solvents used on those adhesives is eliminated, and, furthermore, the need for complex heating processes for adhering is eliminated.

Additionally, while there was a problem of deterioration due to the bonded body being exposed to outdoor ultraviolet rays, this problem is resolved as well.

Test Examples

The present technology will now be described in greater detail using the following test examples. However, the present technology is in no way restricted to these test examples.

1. Preparation of the Rubber Compositions

The raw materials shown below were added to an internal mixer according to the mass ratios shown in Tables 1 and 2, and the rubber compositions shown in Tables 1 and 2 were obtained.

In rubber compositions 1 to 3, EPDM, NBR, NR, and SBR were used as the rubber and a sulfur vulcanizing agent was used. In rubber composition 4, H-NBR was used as the rubber and a peroxide cross-linking agent was used.

Formulations for rubber compositions 1 to 3 are shown in Table 1 and a formulation for the rubber composition 4 is shown in Table 2.

(1) Rubber

The following rubbers were used in rubber compositions 1 to 4.

EPDM: "ESPRENE 505" (tradename), manufactured by Sumitomo Chemical Co., Ltd.

NBR: "Nipol 1041" (tradename), manufactured by Zeon Corporation

NR: "STR20", manufactured by TECH BEE HANG Co., Ltd.

SBR: "Nipol 1502" (tradename), manufactured by Zeon Corporation

H-NBR: "Zetpol 2000L" (tradename), manufactured by Zeon Corporation (2) Compounding Agents The following compounding agents were used in rubber compositions 1 to 4.

FEF Carbon Black: "DIABLACK E" (tradename), manufactured by Mitsubishi Chemical Corporation Paraffin Oil: "Sunper 2280" (tradename), manufactured by Japan Sun Oil Company, Ltd.

Dioctyl Phthalate: "DIACIZER DOP" (tradename), manufactured by Mitsubishi Chemical Corporation Aroma Oil: "Diana Process AH-24" (tradename), manufactured by Idemitsu Kosan, Co., Ltd.

Zinc oxide: "Zinc Oxide #3", manufactured by Seido Chemical Industry Co., Ltd.

Stearic Acid: "Lunac S-25" (tradename); manufactured by Kao Corporation

Sulfur: "Oil Treated Sulfur", manufactured by Hosoi Chemical Industry Co., Ltd.

Accelerator TT: "NOCCELER TT-P" (tradename), manufactured by Ouchi Shinko Chemical Industrial Co., Ltd.

Accelerator CZ: "NOCCELER CZ-G" (tradename), manufactured by Ouchi Shinko Chemical Industrial Co., Ltd.

Accelerator NS: "NOCCELER NS-P" (tradename), manufactured by Ouchi Shinko Chemical Industrial Co., Ltd.

Magnesium Oxide: "Kyowamag 150" (tradename), manufactured by Kyowa Chemical Industry Co., Ltd.

Triallyl Isocyanurate: "TAIC" (tradename), manufactured by Nippon Kasei Chemical Co., Ltd.

Triisononyl Trimellitate: "ADK CIZER C-9N" (tradename), manufactured by ADEKA Corporation 2. Preparation of the Carbon Thin Film Covered Articles (1) Polyamide Sheet Covering with a carbon thin film (covering with a diamond-like carbon thin film) was performed using a high-frequency plasma CVD process using acetylene gas as a plasma source gas so that thicknesses of the carbon thin film on polyamide sheets 1 and 2 having widths of 250 mm, lengths of 300 mm, and thicknesses of 0.5 mm were 0.2 μm and 0.4 μm.

The following polyamides were used in the polyamide sheets 1 and 2, respectively.

Polyamide Sheet 1: "RILSAN BESNO TL" (tradename), manufactured by ARKEMA Inc.

Polyamide Sheet 2: "UBE Nylon 5033B" (tradename), manufactured by Ube Industries, Ltd.

(2) Metal Plate

Covering with a carbon thin film (covering with a diamond-like carbon film) was performed using a high-frequency plasma CVD process using acetylene gas as a plasma source gas so that the thickness of the carbon thin film on a metal sheet (formed from hot-rolled steel product SS400 according to the stipulations of JISG 3101) having a width of 25 mm, a length of 60 mm, and a thickness of 1.5 mm was 0.2 μm.

3. Manufacturing Conditions for the Bonded Body of the Carbon thin Film Covered Article and the Rubber (1) Bonded Body of the Carbon thin Film Covered Polyamide Sheet and the Rubber Unvulcanized rubber sheets made from the rubber compositions 1 to 4 having thicknesses of 2 mm were prepared on an open roller mill. The polyamide sheets 1 and 2 were affixed to these unvulcanized rubber sheets so as to be in contact with a surface covered with the carbon thin film. A metal mold measuring 6"×6"×2.5 mm (Length×Width×Thickness) was used, and vulcanization was performed according to the pressing conditions shown in Table 3. Thus, the bonded body of the carbon thin film covered polyamide sheet and the rubber was obtained.

(2) Bonded Body of the Carbon thin Film Covered Metal Plate and the Rubber

Metal plates were affixed, so as to have a shape and dimensions of the sample stipulated in JIS K 6256-2, to unvulcanized rubber sheets made from the rubber compositions 1 to 4 having thicknesses of 2 mm obtained in the same manner as in (1) so as to be in contact with the surface covered with the carbon thin film. Vulcanization was performed according to the pressing conditions shown in Table 3. Thus, the bonded body of the carbon thin film covered metal plate and the rubber was obtained.

4. Evaluation Criteria and Evaluation Method for the Bonded Body of the Carbon thin Film Covered Article and the Rubber (1) Bonded Body of the Carbon thin Film Covered Polyamide Sheet and the Rubber A sample having a width of 25 mm was cut from an obtained bonded body sheet of the carbon thin film covered polyamide sheet and the rubber. A peeling test between the polyamide sheet and the rubber was performed at a peeling speed of 50 mm/minute. Bonding strength (N/25 mm) at this time and rubber adhesive pick up (%) was measured.

Here, "bonding strength" refers to bonding strength (N) per each 25 mm width.

Additionally, the rubber adhesive pick up was expressed as a ratio of an area where the rubber did not peel off of the carbon thin film covered polyamide sheet, and remained thereon, to an area of peeling performed. A larger adhesive pick up indicates excellent bonding with the carbon thin film covered polyamide sheet.

(2) Bonded Body of the Carbon thin Film Covered Metal Plate and the Rubber

The obtained bonded body of the carbon thin film covered metal plate and the rubber was subjected to peeling testing in accordance with JIS K 6256-2. Bonding strength (N/25 mm) and rubber adhesive pick up (%) were measured. "Bonding strength" was the strength per each 25 mm width and the rubber adhesive pick up was calculated the same as in (1).

These results are shown in Table 3.

TABLE 1

Sulfur Vulcanization Formulation

| | Rubber composition 1 | Rubber composition 2 | Rubber composition 3 |
|---|---|---|---|
| EPDM | 100 | | |
| NBR | | 100 | |
| NR | | | 80 |
| SBR | | | 20 |
| FEF Carbon black | 60 | 60 | 50 |
| Paraffin Oil | 20 | | |
| Dioctyl Phthalate | | 15 | |
| Aromatic oil | | | 2 |
| Zinc oxide | 5 | 5 | 3 |
| Stearic acid | 1 | 1 | 2 |
| Sulfur | 1 | 1 | 3 |
| Accelerator TT | 2 | 2 | |
| Accelerator CZ | 1 | 1 | |
| Accelerator NS | | | 1 |

TABLE 2

Peroxide Cross-Linking Formulation

|  | Rubber composition 4 |
|---|---|
| H-NBR | 100 |
| FEF Carbon black | 70 |
| Magnesium oxide | 8 |
| Zinc oxide | 2 |

TABLE 2-continued

Peroxide Cross-Linking Formulation

|  | Rubber composition 4 |
|---|---|
| Stearic acid | 1 |
| Triallyl Isocyanulate | 2 |
| Triisononyl Trimellitate | 8 |

TABLE 3

|  | Type of Rubber Composition | Cross-Linking Form | Pressing Conditions | Covered Article | DLC Thickness (μm) | Bonding Strength (N/25 mm) | Rubber Adhesive Pick Up (%) |
|---|---|---|---|---|---|---|---|
| Test Example 1 | Rubber composition 1 | Sulfur | 148° C. × 60 min | Polyamide sheet 1 | 0.2 | 102 | 90 |
| Test Example 2 | Rubber composition 1 | Sulfur | 148° C. × 60 min | Polyamide sheet 1 | 0.4 | 96 | 90 |
| Comp. Ex. 1 | Rubber composition 1 | Sulfur | 148° C. × 60 min | Polyamide sheet 1 | None | 1 | 0 |
| Test Example 3 | Rubber composition 1 | Sulfur | 148° C. × 60 min | Polyamide sheet 2 | 0.2 | 98 | 90 |
| Test Example 4 | Rubber composition 1 | Sulfur | 148° C. × 60 min | Polyamide sheet 2 | 0.4 | 100 | 100 |
| Comp. Ex. 2 | Rubber composition 1 | Sulfur | 148° C. × 60 min | Polyamide sheet 2 | None | 1 | 0 |
| Test Example 5 | Rubber composition 1 | Sulfur | 148° C. × 60 min | Metal plate | 0.2 | 105 | 100 |
| Comp. Ex. 3 | Rubber composition 1 | Sulfur | 148° C. × 60 min | Metal plate | None | 1 | 0 |
| Test Example 6 | Rubber composition 2 | Sulfur | 148° C. × 60 min | Polyamide sheet 1 | 0.2 | 135 | 100 |
| Test Example 7 | Rubber composition 2 | Sulfur | 148° C. × 60 min | Polyamide sheet 1 | 0.4 | 142 | 90 |
| Comparative Example 4 | Rubber composition 2 | Sulfur | 148° C. × 60 min | Polyamide sheet 1 | None | 1 | 0 |
| Test Example 8 | Rubber composition 2 | Sulfur | 148° C. × 60 min | Polyamide sheet 2 | 0.2 | 140 | 90 |
| Test Example 9 | Rubber composition 2 | Sulfur | 148° C. × 60 min | Polyamide sheet 2 | 0.4 | 140 | 100 |
| Comparative Example 5 | Rubber composition 2 | Sulfur | 148° C. × 60 min | Polyamide sheet 2 | None | 1 | 0 |
| Test Example 10 | Rubber composition 2 | Sulfur | 148° C. × 60 min | Metal plate | 0.2 | 142 | 100 |
| Comparative Example 6 | Rubber composition 2 | Sulfur | 148° C. × 60 min | Metal plate | None | 1 | 0 |
| Test Example 11 | Rubber composition 3 | Sulfur | 160° C. × 20 min | Polyamide sheet 1 | 0.2 | 82 | 90 |
| Test Example 12 | Rubber composition 2 | Sulfur | 160° C. × 20 min | Polyamide sheet 1 | 0.4 | 80 | 100 |
| Comparative Example 7 | Rubber composition 3 | Sulfur | 160° C. × 60 min | Polyamide sheet 1 | None | 1 | 0 |
| Test Example 13 | Rubber composition 3 | Sulfur | 160° C. × 20 min | Polyamide sheet 2 | 0.2 | 83 | 100 |
| Test Example 14 | Rubber composition 3 | Sulfur | 160° C. × 20 min | Polyamide sheet 2 | 0.4 | 82 | 90 |
| Comparative Example 8 | Rubber composition 3 | Sulfur | 160° C. × 20 min | Polyamide sheet 2 | None | 1 | 0 |
| Test Example 15 | Rubber composition 3 | Sulfur | 160° C. × 20 min | Metal plate | 0.2 | 83 | 100 |
| Comparative Example 9 | Rubber composition 3 | Sulfur | 160° C. × 20 min | Metal plate | None | 1 | 0 |
| Test Example 16 | Rubber composition 4 | Peroxide | 153° C. × 90 min | Polyamide sheet 1 | 0.2 | 89 | 90 |
| Test Example 17 | Rubber composition 4 | Peroxide | 153° C. × 90 min | Polyamide sheet 1 | 0.4 | 88 | 100 |
| Comparative Example 10 | Rubber composition 4 | Peroxide | 153° C. × 90 min | Polyamide sheet 1 | None | 1 | 0 |
| Test Example 18 | Rubber composition 4 | Peroxide | 153° C. × 90 min | Polyamide sheet 2 | 0.2 | 88 | 100 |
| Test Example 19 | Rubber composition 4 | Peroxide | 153° C. × 90 min | Polyamide sheet 2 | 0.4 | 90 | 100 |
| Comparative Example 11 | Rubber composition 4 | Peroxide | 153° C. × 90 min | Polyamide sheet 2 | None | 1 | 0 |

TABLE 3-continued

| | Type of Rubber Composition | Cross-Linking Form | Pressing Conditions | Covered Article | DLC Thickness (μm) | Bonding Strength (N/25 mm) | Rubber Adhesive Pick Up (%) |
|---|---|---|---|---|---|---|---|
| Test Example 20 | Rubber composition 4 | Peroxide | 153° C. × 90 min | Metal plate | 0.2 | 90 | 100 |
| Comparative Example 12 | Rubber composition 4 | Peroxide | 153° C. × 90 min | Metal plate | None | 1 | 0 |

As is clear from Table 3, the bonded body of the test examples according to the present technology displayed excellent bonding strength and rubber adhesive pick up. In contrast, the bonded bodies of the comparative examples that were not carbon covered displayed low bonding strength and interfacial failure was observed.

Therefore, it is concluded that the bonded body of the carbon thin film covered article and the rubber of the present technology has exceedingly superior bonding strength.

As described above, with the bonded body of the carbon thin film covered article and the rubber according to the present technology, an article with excellent bondability with unvulcanized rubber can be provided.

What is claimed is:

1. A bonded body of a carbon thin film covered article and a vulcanized rubber, wherein the bonded body is obtained by bonding a carbon thin film covered article having a carbon thin film formed on a surface of an article to an unvulcanized rubber by affixing and vulcanizing, wherein the vulcanized rubber and the carbon thin film are cross-linked as a result of the vulcanizing.

2. The bonded body according to claim 1, wherein the carbon thin film is a diamond-like carbon film (DLC film).

3. The bonded body according to claim 1, wherein the article is formed from one of a metal, a resin, or a rubber.

4. The bonded body according to claim 1, wherein the carbon thin film is formed by a plasma CVD process.

5. The bonded body according to claim 1, wherein the unvulcanized rubber is vulcanized using either a sulfur vulcanizing agent or a peroxide vulcanizing agent mixed with the unvulcanized rubber.

6. A method of manufacturing a bonded body according to claim 1, comprising: obtaining a bonded body of a carbon thin film covered article and a rubber by forming a carbon thin film on a surface of an article, then directly affixing an unvulcanized rubber thereto and, thereafter, vulcanizing.

7. The bonded body according to claim 1, wherein the article is formed from a resin or a rubber.

8. The bonded body according to claim 2, wherein, the carbon thin film is formed by a plasma CVD process.

9. The bonded body according to claim 2, wherein the unvulcanized rubber is vulcanized using either a sulfur vulcanizing agent or a peroxide vulcanizing agent.

10. The bonded body according to claim 3, wherein the unvulcanized rubber is vulcanized using either a sulfur vulcanizing agent or a peroxide vulcanizing agent.

11. The bonded body according to claim 4, wherein the unvulcanized rubber is vulcanized using either a sulfur vulcanizing agent or a peroxide vulcanizing agent.

12. The bonded body according to claim 1, wherein a thickness of the carbon thin film is 0.1 μm or greater.

13. The bonded body according to claim 1, wherein a thickness of the carbon thin film is 0.2 μm or greater.

14. The bonded body according to claim 1, wherein a thickness of the carbon thin film is approximately 0.1 μm to 0.4 μm.

15. The bonded body according to claim 1, wherein the unvulcanized rubber is vulcanized using a sulfur vulcanizing agent.

16. The bonded body according to claim 1, wherein the unvulcanized rubber is vulcanized using a peroxide vulcanizing agent.

17. The bonded body according to claim 1, wherein the carbon thin film is an amorphous carbon film.

18. The method of manufacturing a bonded body according to claim 6, wherein the carbon thin film is a diamond-like carbon film (DLC film).

19. The method of manufacturing a bonded body according to claim 6, wherein the article is formed from one of a metal, a resin, or a rubber.

20. The bonded body according to claim 1, wherein the unvulcanized rubber comprises at least one of natural rubber (NR), nitrile butadiene rubber (NBR), hydrogenated NBR (H-NBR), or styrene-butadiene rubber (SBR).

* * * * *